(12) United States Patent  
Agranonik et al.

(10) Patent No.: US 12,141,280 B2
(45) Date of Patent: Nov. 12, 2024

(54) DEEP LEARNING-BASED ANALYSIS OF SIGNALS FOR THREAT DETECTION

(71) Applicant: MICROSOFT TECHNOLOGY LICENSING, LLC, Redmond, WA (US)

(72) Inventors: Arie Agranonik, Herzliya (IL); Shay Kels, Givatayim (IL); Ofer Raz, Kfar Tavor (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 16/917,177

(22) Filed: Jun. 30, 2020

(65) Prior Publication Data

US 2021/0406368 A1 Dec. 30, 2021

(51) Int. Cl.
G06F 21/56 (2013.01)
G06F 9/54 (2006.01)
G06F 17/18 (2006.01)
G06N 3/08 (2023.01)

(52) U.S. Cl.
CPC .............. *G06F 21/56* (2013.01); *G06F 9/542* (2013.01); *G06F 17/18* (2013.01); *G06N 3/08* (2013.01)

(58) Field of Classification Search
CPC .......... G06F 21/56; G06F 9/542; G06F 17/18; G06N 3/08
See application file for complete search history.

(56) References Cited

U.S. PATENT DOCUMENTS

| 9,294,501 | B2 * | 3/2016 | Mesdaq | H04L 63/1416 |
| 10,230,749 | B1 * | 3/2019 | Rostami-Hesarsorkh | |
| | | | | G06F 21/56 |
| 10,778,705 | B1 * | 9/2020 | Park | H04L 63/1425 |

(Continued)

FOREIGN PATENT DOCUMENTS

EP 4266201 A1 * 10/2023 ........... G06F 21/566

OTHER PUBLICATIONS

Hassan, et al., "Tactical Provenance Analysis for Endpoint Detection and Response Systems", In IEEE Symposium on Security and Privacy, May 18, 2020, pp. 1172-1189.

(Continued)

*Primary Examiner* — Saleh Najjar
*Assistant Examiner* — Devin E Almeida
(74) *Attorney, Agent, or Firm* — Shook, Hardy & Bacon L.L.P.

(57) ABSTRACT

Embodiments of the present disclosure provide systems, methods, and non-transitory computer storage media for identifying malicious behavior using a trained deep learning model. At a high level, embodiments of the present disclosure utilize a trained deep learning model that takes a sequence of ordered signals as input to generate a score that indicates whether the sequence is malicious or benign. Initially, process data is collected from a client. After the data is collected, a virtual process tree is generated based on parent and child relationships associated with the process data. Subsequently, embodiments of the present disclosure aggregate signal data with the process data such that each signal is associated with a corresponding process in a chronologically ordered sequence of events. The ordered sequence of events is vectorized and fed into the trained deep learning model to generate a score indicating the level of maliciousness of the sequence of events.

20 Claims, 9 Drawing Sheets

(56) References Cited

U.S. PATENT DOCUMENTS

| | | | | |
|---|---|---|---|---|
| 10,915,631 | B2* | 2/2021 | Chen | G06N 3/08 |
| 11,558,401 | B1* | 1/2023 | Vashisht | H04L 63/1416 |
| 2017/0142140 | A1* | 5/2017 | Muddu | G06N 5/022 |
| 2018/0189339 | A1* | 7/2018 | Ananthakrishnan | |
| | | | | G06F 11/3006 |
| 2018/0314983 | A1* | 11/2018 | Sai | H04L 63/145 |
| 2018/0322276 | A1* | 11/2018 | Brown | H04L 63/1433 |
| 2020/0167464 | A1* | 5/2020 | Griffin | G06N 3/0481 |
| 2020/0314117 | A1* | 10/2020 | Nguyen | H04L 63/145 |
| 2020/0364338 | A1* | 11/2020 | Ducau | G06F 21/564 |
| 2021/0089420 | A1* | 3/2021 | Kitahara | G06F 11/3024 |
| 2021/0185066 | A1* | 6/2021 | Shah | G06N 3/08 |
| 2021/0303986 | A1* | 9/2021 | Saha | G06F 16/55 |

OTHER PUBLICATIONS

Luh, et al., "Advanced Threat Intelligence: Detection and Classification of Anomalous Behavior in System Processes", In Journal of Elektrotechnik und Informationstechnik, vol. 137, Issue 1, Dec. 13, 2019, pp. 38-44.

"International Search Report & Written Opinion Issued in PCT Application No. PCT/US2021/036308", Mailed Date: Sep. 13, 2021, 32 Pages.

"Worm:JS/Bondat", Retrieved from: https://www.microsoft.com/en-us/wdsi/threats/malware-encyclopedia-description?Name=Worm:JS/Bondat&threatId=-2147277600, Apr. 3, 2013, 2 Pages.

Kels, et al., "Deep learning rises: New methods for detecting malicious PowerShell", Retrieved from: https://www.microsoft.com/security/blog/2019/09/03/deep-learning-rises-new-methods-for-detecting-malicious-powershell/, Sep. 3, 2019, 15 Pages.

Kels, et al., "Windows Defender ATP machine learning: Detecting new and unusual breach activity", Retrieved from: https://www.microsoft.com/security/blog/2017/08/03/windows-defender-atp-machine-learning-detecting-new-and-unusual-breach-activity/, Aug. 3, 2017, 16 Pages.

Sellmer, et al., "Windows Defender ATP machine learning and AMSI: Unearthing script-based attacks that 'live off the land'", Retrieved from: https://www.microsoft.com/security/blog/2017/12/04/windows-defender-atp-machine-learning-and-amsi-unearthing-script-based-attacks-that-live-off-the-land/, Dec. 4, 2017, 18 Pages.

"Bag-of-Words Model", Retrieved From: https://web.archive.org/web/20200206191040/https://en.wikipedia.org/wiki/Bag-of-words_model, Dec. 18, 2019, 5 Pages.

"Introducing Microsoft Threat Protection", Retrieved From: https://web.archive.org/web/20200307131924/https://www.microsoft.com/en-us/security/business/threat-protection, Mar. 7, 2020, 5 Pages.

"Microsoft Defender Advanced Threat Protection", Retrieved From: https://web.archive.org/web/20200104133207/https://www.microsoft.com/en-us/microsoft-365/windows/microsoft-defender-atp, Jan. 4, 2020, 12 Pages.

Agranonik, et al., "Seeing the Big Picture: Deep Learning-based Fusion of Behavior Signals for Threat Detection", Retrieved From: https://www.microsoft.com/security/blog/2020/07/23/seeing-the-big-picture-deep-learning-based-fusion-of-behavior-signals-for-threat-detection/, Jul. 23, 2020, 17 Pages.

Wang, et al., "Combination of Convolutional and Recurrent Neural Network for Sentiment Analysis of Short Texts", In Proceedings of 26th International Conference on Computational Linguistics: Technical Papers, Dec. 11, 2016, pp. 2428-2437.

* cited by examiner

DEEP LEARNING-BASED ANALYSIS OF SIGNALS FOR THREAT DETECTION

BACKGROUND

Generally, endpoint security platforms (e.g., Microsoft Defender Advanced Threat Protection) provide industry-leading detection of malicious activities and artifacts on endpoints using various types of signals that span endpoint and network behaviors. These signals may be aggregated and processed by heuristics and machine learning models. In many cases, the detection of a particular type of behavior, such as registry modification or a PowerShell command, by a single heuristic or machine learning model is sufficient to create an alert. Additionally, some methods are able to evaluate multiple signals occurring at different times to detect more sophisticated threats by taking into account numerous factors that, when analyzed together, are indicative of malicious behavior. However, such conventional approaches for identifying potentially malicious behavior among endpoints or within a network remain deficient, despite the ability to identify and analyze multiple signals at various times.

SUMMARY

Various aspects of the technology described herein are generally directed to systems, methods, and computer storage media for, among other things, detecting malicious activity or artifacts on a computer system. In particular, process data from a client computer system may be aggregated with other signals, organized as a sequence of events, and fed into the trained deep learning model. The trained deep learning model can evaluate the sequence of events using multiple layers and output a score that indicates the probability of the sequence of events being malicious. As such, when the score exceeds an alert threshold, embodiments may cause a security risk mitigation action such as removing the malware or other malicious executable or, alternatively, notify an alert system indicating that the sequence of events is likely malicious.

According to the operation of one embodiment, process data may be received from a client, and a virtual process tree may be generated that details parent and child relationships of the processes from the process data. Subsequently, an event scoring model of an event scoring service in the computing environment can associate signals with the process data. These signals in combination with the process data may be transformed into a vectorized sequence of events ordered chronologically based on execution of the processes. The vector may be fed into multiple layers of a trained deep learning model to generate a score that indicates whether the sequence represented by the vector is malicious. For example, the score may be a number between 0 and 1 indicating the probability of the sequence being malicious. Embodiments may then compare the score to an alert threshold to determine whether the score exceeds (or satisfies) the alert threshold and cause a security risk mitigation action such as removing the malware or other malicious executable and/or notify an alert system when the score exceeds (or satisfies) the threshold. In some embodiments, the trained model may be used in combination with other models for scoring a particular sequence of events to facilitate detecting malicious activity or artifacts. Advantageously, by employing a trained deep learning model to analyze a virtual process tree in combination with associated signals over time, embodiments of the present disclosure improve the comprehensive protection for entities combating malicious activity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
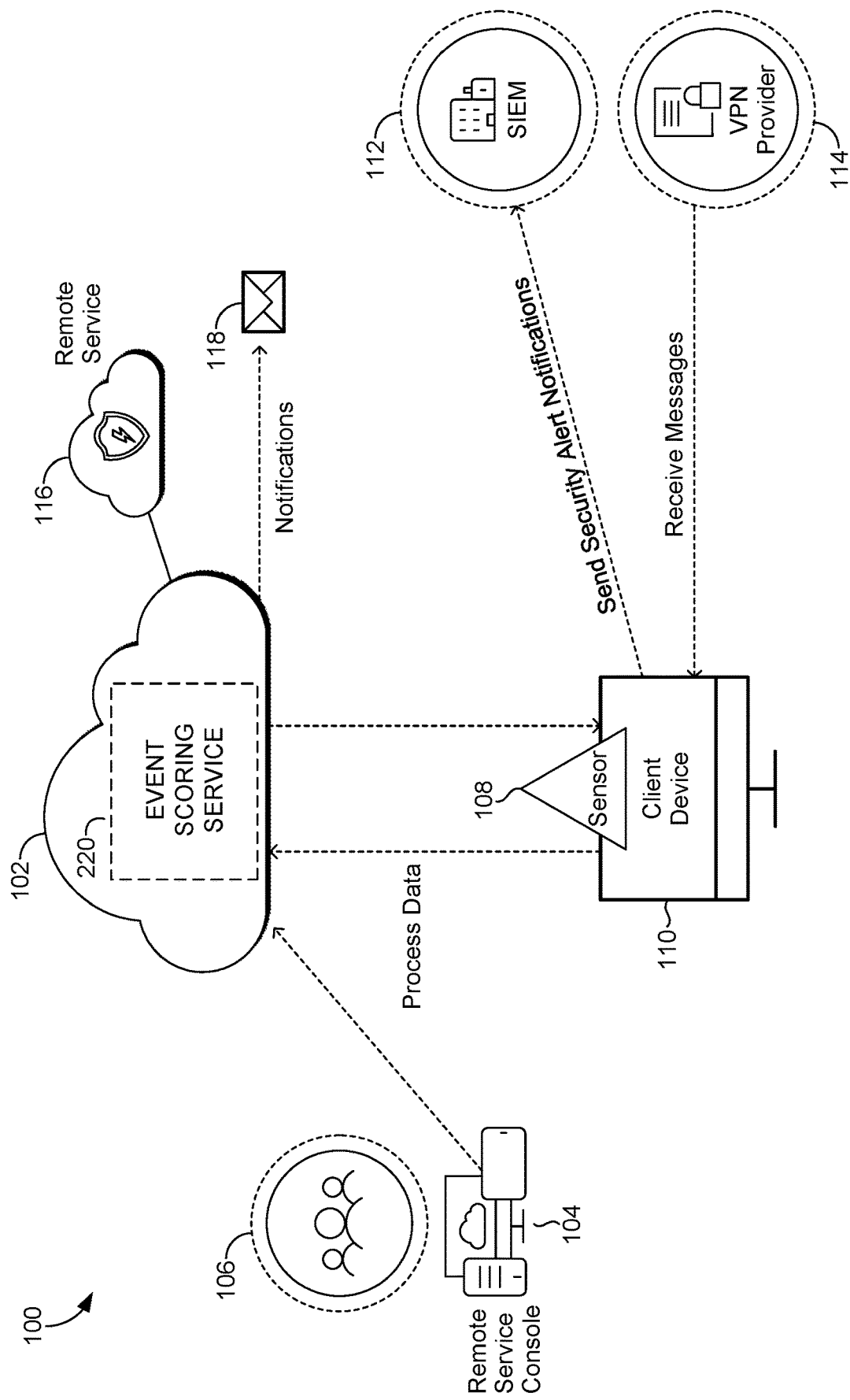
FIG. 1 is a block diagram of an example cloud-based service environment, suitable for use in implementing aspects of the technology described herein.

Overview of Technical Problems, Technical Solutions, and Technological Improvements Generally, endpoint security platforms (e.g., Microsoft Defender Advanced Threat Protection) provide industry-leading detection of malicious activities and artifacts on endpoints using various types of signals that span endpoint and network behaviors. These signals may be aggregated and processed by heuristics and machine learning models. In many cases, the detection of a particular type of behavior, such as registry modification or a PowerShell command, by a single heuristic or machine learning model is sufficient to create an alert.

However, detecting a wider range of sophisticated threats and malicious behaviors is significantly enhanced by analyzing a fusion of signals occurring at different times. For example, analyzing an isolated event, such as file creation, may not provide an accurate indication of malicious activity. For example, when supplemented with an analysis that a scheduled task is created with the same dropped file, and combined with other signals, the file creation event becomes a significant indicator of malicious activity. As such, analyzing signals that aggregate individual signals to create a wholesome environment and create behavior-based detections that expose advanced malicious behavior that may typically go undetected.

Embodiments of the present disclosure analyze process data and aggregate the data with signals to create a vectorized sequence of events that may be fed into a trained deep learning model. By using process data fused with signal data, embodiments of the present disclosure can analyze executed processes and significantly enhance the analysis by combining signals occurring at different time periods during the execution of the processes. For example, analyzing an isolated event of file creation generally does not provide an indication of malicious activity. However, when supplemented with a second observation that a scheduled task is created with the same dropped file, and combined with other signals, the file creation event becomes a significant indicator of malicious activity. As such, embodiments of the present disclosure detect sophisticated attacks and malware campaigns.

Embodiments of the present disclosure can utilize machine learning classifiers (e.g., deep learning models) to digest potentially large volumes of historical data and can automatically apply extracted insights to score data points as malicious or benign. For example, these machine learning-based models may analyze registry-related information and generate a probability score which indicates the probability of the registry activity (e.g., a write operation) being associated with malicious activity. By employing a model comprising several deep learning building blocks, such as convolutional neural networks (CNN) and long short-term memory recurrent neural networks (LSTM-RNN), embodiments of the present disclosure can take signals that occur chronologically in the process tree as input and analyze a batch of signals as a sequence of events. As a result, embodiments can classify sequences of events with a high-degree of precision and detection coverage.

Particularly, in order to enhance threat detection by using the trained model(s), embodiments of the present disclosure can structure behaviors into a virtual process tree so that signals may be associated and/or aggregated with processes in the tree. Because each signal occurs in the context of a process tree, embodiments of the present disclosure can associate the signals with processes in the process tree. For example, a signal may encompass an entry in a particular registry key. As another example, a signal may be a service start activity. While these signals themselves may not appear malicious in isolation, the embodiments of this disclosure can analyze and recognize suspicious patterns of events by aggregating signals with processes in chronological order based on their execution time. As such, the deep learning model(s) employed by embodiments of the present disclosure can utilize processes and signals structured as a sequence of events as input into the model(s) to analyze the sequence of events during a certain period of time for each virtual process tree in order to detect potentially malicious activity in or associated with the sequence of events.

Advantageously, embodiments of the present disclosure can efficiently analyze multiple signals to identify potentially malicious activity. By employing a trained deep learning-based model to analyze a virtual process tree in combination with associated signals during a certain period of time, embodiments of the present disclosure improve the comprehensive protection for entities combating malicious activity. Embodiments are able to remember long sequences of process and aggregate that data with other signals to determine the likelihood that a particular sequence is malicious. As a result, the deep-learning based technology employed by embodiments of the present disclosure provides improved protection against real-world threats and attacks.

Having briefly described an overview of aspects of the present disclosure, various terms used throughout this description are provided. Although more details regarding various terms are provided throughout this description, general descriptions of some terms are included below to provide a clear understanding of ideas disclosed herein:

Process data or processes generally refer to any process(es) or activity performed, operated, or executed by a machine to complete a task. As one example, a process may be any instance of a computer program that is being executed.

Signal data, behavior signals, or signals generally refer to any information, human-generated or computer-generated, which indicates the potential for, or confirmation of, a cybersecurity vulnerability or exploit that affects, or could affect, a machine, computer, endpoint, computer network and/or system, or anything of the like. For example, a signal could be a particular type of behavior, such as registry modification or a PowerShell command.

An event generally refers to any action, activity, or behavior, including process data and signal data or a combination and/or association thereof, performed or executed by a machine, computer, endpoint, computer network and/or system, or anything of the like.

Overview of Example Environments for Detecting Malicious Sequences of Events

Aspects of the technical solution can be described by way of examples and with reference to FIG. 1 and additional illustrations below. FIG. 1 illustrates a block diagram of an example cloud-based service environment suitable for use in implementing embodiments of the present disclosure. Generally, environment 100 is suitable for detecting and identifying potentially malicious sequences of events using a trained model by taking, as input, a vector of signals associated with process data ordered chronologically. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1 is an example of one suitable operating environment. A cloud-based service environment generally contains cloud-based service 102 (e.g., Microsoft Advanced Threat Protection (ATP)), which contains event scoring service 220. At a high level, cloud-based service 102 monitors client device 110 by capturing and parsing process data and leveraging events and activity logged by the client device 110 and other machines connected and/or integrated with client device 110. Cloud-based service 102 may analyze the received data to perform operations such as attack and threat detection. For example, event scoring service 220 residing in cloud-based service 102 may employ a trained deep learning model to analyze signals associated with chronologically ordered process data to identify potentially malicious activity.

As shown, cloud-based service 102 may be connected to a remote service console 104 (e.g., Microsoft Defender ATP Portal) that enables monitoring, management, and investigation of data captured by cloud-based service 102 by groups of user 106. For example, remote service console 104 allows integration of cloud-based service 102 with other services, management of configuration settings for sensor 108, viewing data received from cloud-based service 102, and enabling monitoring of detected suspicious activities and suspected attacks based on an attack kill chain model.

To assist in collection of process data from client device 110, sensor 108 may be installed directly on client device 110. In embodiments, sensor 108 may be installed as part of the operating system installed on client device 110. For example, sensor 108 may read and/or collect process data locally, without requiring additional hardware or configurations. Sensor 108 also supports event tracing which provides the log information for multiple detections. As one example, process data detections include suspected Bondat Worm attacks that collects information about a device, infect removable drives, and attempt to stop the device from accessing files. Client device 110 may communicate information with security information and event management entity 112. Security information and event management entity 112 may perform such functions such as providing real-time analysis of security alerts generated by applications and network hardware such as client device 110.

Cloud-based service 102 may send notifications 118 to multiple entities or users. For example, notification 118 may be an email to a security analyst of a network security team providing information analyzed by event scoring service 220. Alternatively, communication of the information in notification 118 may be also viewed by remote service console 104. As such, cloud-based service 102 can notify multiple entities or individuals at a single time to convey analyzed information such as malicious activity or attacks detected by event scoring service 220.

Additionally, cloud-based service 102 may be connected to remote service 116. As shown, remote service 116 may be cloud-based and may receive information from cloud-based service 102 and send information to cloud-based service 102. Alternatively, remote service 116 may be a standalone platform. For example, remote service 116 may deploy Microsoft® Defender Advanced Threat Protection (ATP) designed to enable enterprise networks to prevent, detect, investigate, and respond to advanced threats. As such, remote service 116 may use information gathered by cloud-based service 102 to perform endpoint behavioral analysis, perform cloud security analytics, and analyze other threat intelligence. For example, sensors may be utilized by remote service 116 to collect and process behavioral signals and event data from the operating system of a computer. As another example, remote service 116 may leverage intelligence and other data generated by hunters, security teams, and other individuals or entities to enable identification of attacker tools, techniques, and procedures, and generate alerts when these are observed. In embodiments, event scoring service 220 may utilize information gathered by remote service 116. In other embodiments, event scoring service 220 may utilize a combination of information (e.g., signal data) gathered, collected, or analyzed by remote service 116 and information (e.g., process data) gathered from sensor 108 on client device 110.

Figure 2:
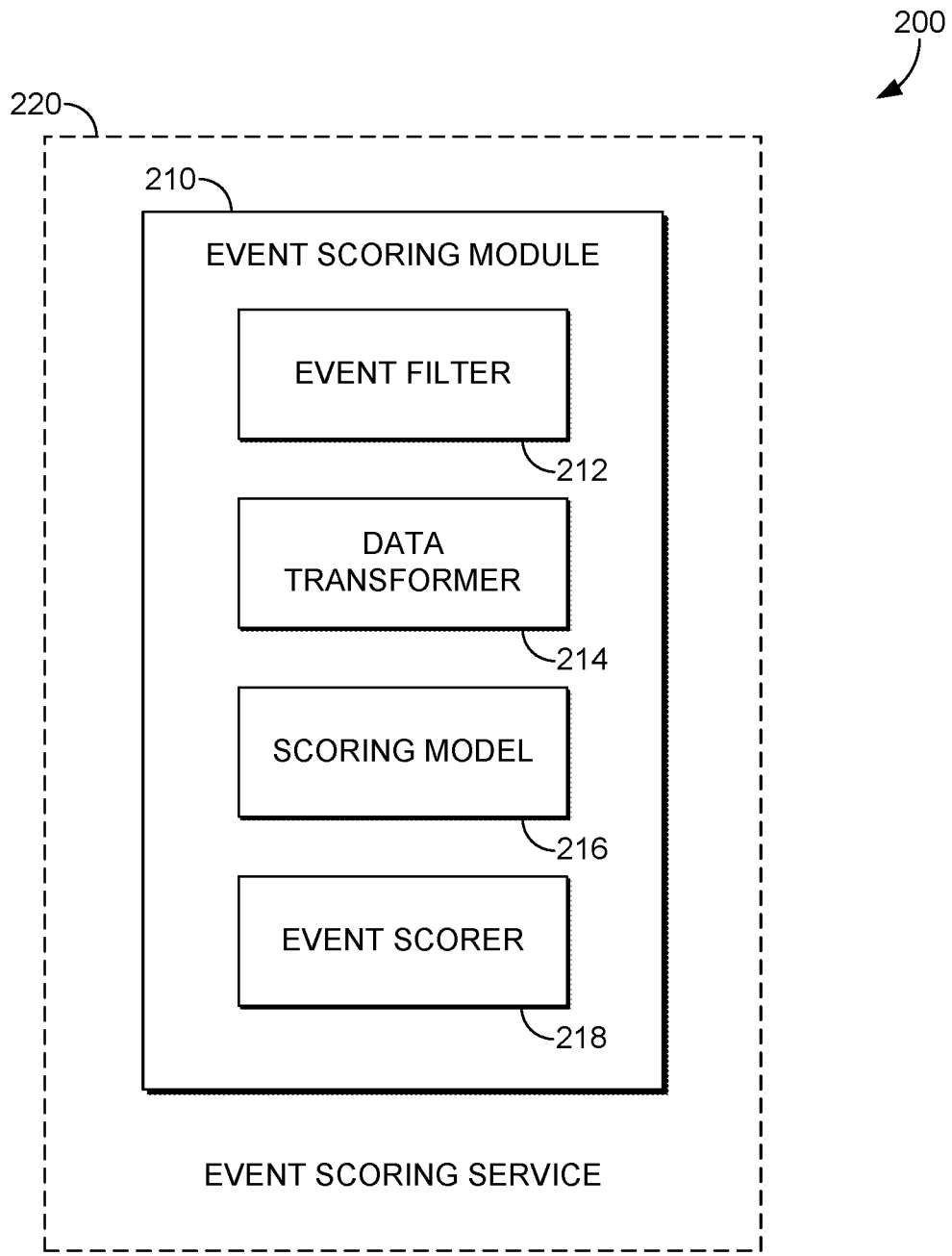
FIG. 2 is a block diagram of an example event scoring architecture for scoring process and signal data using an event scoring model, suitable for use in implementing aspects of the technology described herein.

Referring to FIG. 2, a block diagram is provided showing an exemplary technical solution architecture (event scoring module architecture 200) suitable for use in implementing embodiments of the technical solution. Generally, the technical solution architecture includes a technical solution system suitable for providing an event scoring service based on an event scoring model. As shown, FIG. 2 discloses an event scoring module architecture 200, event scoring service 220, event scoring module 210 having event filter 212, a data transformer 214, a scoring model 216, and an event scorer 218.

In embodiments, event scoring service 220 may be deployed in cloud-based service 102 as discussed in conjunction with at least FIG. 1. Alternatively, an event scoring service may be implemented into any suitable computing device or computing environment such as client device 880 or described in conjunction with at least FIG. 8 and computing device 900 described in conjunction with at least FIG. 9. In embodiments, event scoring service 220 contains an event scoring module 210 utilized to detect malicious activity based on signals associated with processes structured in chronological order based on their execution time. Although not shown for clarity, event scoring module 210 can store computer instructions (e.g., software program instructions, routines, or services), data, and/or models used in embodiments described herein.

As an overview, event scoring module 210 utilizes components 212, 214, 216, and/or 218 and/or a combination thereof to implement the method described below in conjunction with at least FIGS. 3, 4, and 7. event filter 212 may collect signals, including but not limited to raw signals and human-generated signals, and filter the signals based on certain criteria (e.g., usage related to malicious activity) into a vocabulary that is used for pre-processing. Data transformer 214 may collect process data from a client and filter the data according to the vocabulary determined by event filter 212. In other words, data transformer 214 transforms raw data into a readable format for event scorer 218 to read. Subsequently, data transformer 214 generates a virtual process tree based on the filtered process data. The virtual process tree is then aggregated with signals and ordered chronologically such that a vector of a sequence of events is generated based on the parent and child relationships of the process data associated with each signal. Embodiments may then score the data via event scorer 218 which utilizes a trained model from scoring model 216 (e.g., trained deep learning model) to take the vector of the sequence of events as input and output a probability (e.g., score between 0 and 1) that the sequence of events transformed from the collected data is potentially malicious. Event scorer 218 then compares the output from scoring model 216 to an alert threshold to determine whether the alert threshold is exceeded (or satisfied). Based on whether the alert threshold is exceeded, an alert may be sent to another client, machine, computer, application programming interface, and/or system indicating that the data analyzed is potentially malicious.

In this way, to initiate determining whether process data executed during a certain time is malicious, event filter 212 serves as a pre-processing component that collects signal data observed over a period of time that is indicative of malicious activity. Event filter 212 is described in more detail below in conjunction with at least FIGS. 3 and 4. For example, event filter 212 may collect raw signals, which are signals that are indicative of malicious activity or another indicator of compromise on their own. For example, registry activity in sensitive places is a raw signal of compromise. As another example, event filter 212 may collect human-generated signals which are signals created by a user that are indicative of malicious activity or another indicator of compromise. These collected signals are then filtered according to various attributes or criteria. For example, one criteria may be the amount of usage that each signal has been used over a period of time. In other words, if some signals are observed more frequently than others, these signals may be kept as part of a signal vocabulary such that they may be associated with process data received from a client. In some embodiments, the signals may be filtered automatically according to criteria selected by a user. In other embodiments the signals may be filtered by a user. As such, event filter 212 generates a repository comprised of a signals vocabulary that are suitable for use by one or more components of event scoring module 210.

Data transformer 214 of event scoring module 210 is generally configured to transform process data received from a client into a vector of a sequence of events that may be scored by event scorer 218 utilizing scoring model 216 and as described in more detail below in conjunction with at least FIGS. 3 and 4. Data transformer 214 initially receives data from a client. This data is then filtered by a signals vocabulary determined by event filter 212 such that relevant signals are selected and may be associated with the received process data. For example, signals related to network activity may not be appropriate for aggregating with the process data received at a particular point in time. After filtering the process data according to the relevant signal vocabulary, embodiments then generate a virtual process tree from the received process data and aggregate the signals into the process tree such that the processes and signals are ordered chronologically. In embodiments, the virtual process tree aggregated with the signals may be converted or generated into any suitable structure that can be fed into a trained machine learning model. For example, data transformer 214 may transform the virtual process tree and associated signals into a vector of a sequence of events that maintains the chronological order of execution of the process data and associated signal data. As such, embodiments convert data received from a client into a vector of chronologically ordered sequence of events based on the process data and aggregated signal data.

Event scorer 218 of event scoring module 210 is generally configured to score the transformed data generated by data transformer 214 and generate an alert based on whether the score exceeds (or satisfies) an alert threshold. As described in more detail below in conjunction with at least FIGS. 3 and 4, event scorer 218 uses a trained model (e.g., machine learning model such as a deep learning model) that takes the vector of the sequence of events as input and produces a score indicating the maliciousness of the sequence of events. For example, the score may be a number between 0 and 1 indicating the probability that the sequence of events is malicious. Embodiments then compare the score generated by the trained model to an alert threshold. If the alert threshold is exceeded, event scorer 218 may send an alert to a user, computer, machine, application programming interface, and/or other system indicating that the sequence of events is malicious. Thus, event scorer 218 is able to utilize a trained machine learning model to score a sequence of events indicative of malicious activity.

Scoring model 216 of event scoring module 210 is generally configured to store trained machine learning models utilized by event scorer 218. In embodiments, scoring model 216 may be configured to train any suitable model (e.g., deep learning-based machine learning models) for processing sequences of events as input. Additionally, scoring model 216 may store multiple models in a repository for access by event scorer 218. As described in more detail below in conjunction with at least FIGS. 3 and 4, in embodiments, scoring model 216 may contain a trained machine learning model that receives a vector of a sequence of events as input. In some embodiments, the trained model may be a standalone machine learning model or a combination of one or more models. For example, the trained model may be comprised of a deep neural network that combines one or more building layers such as a convolutional neural network (CNN) and a bidirectional long short-term memory recurrent neural network (BiLSTM-RNN). In other embodiments, scoring model 216 may use multiple models to supplement the scoring a sequence of events by event scorer 218. As a result, scoring model 216 may be utilized by event scorer 218 to score a sequence of events indicating whether the sequence of events is potentially malicious.

Example Methods for Event Scoring

Figure 3:
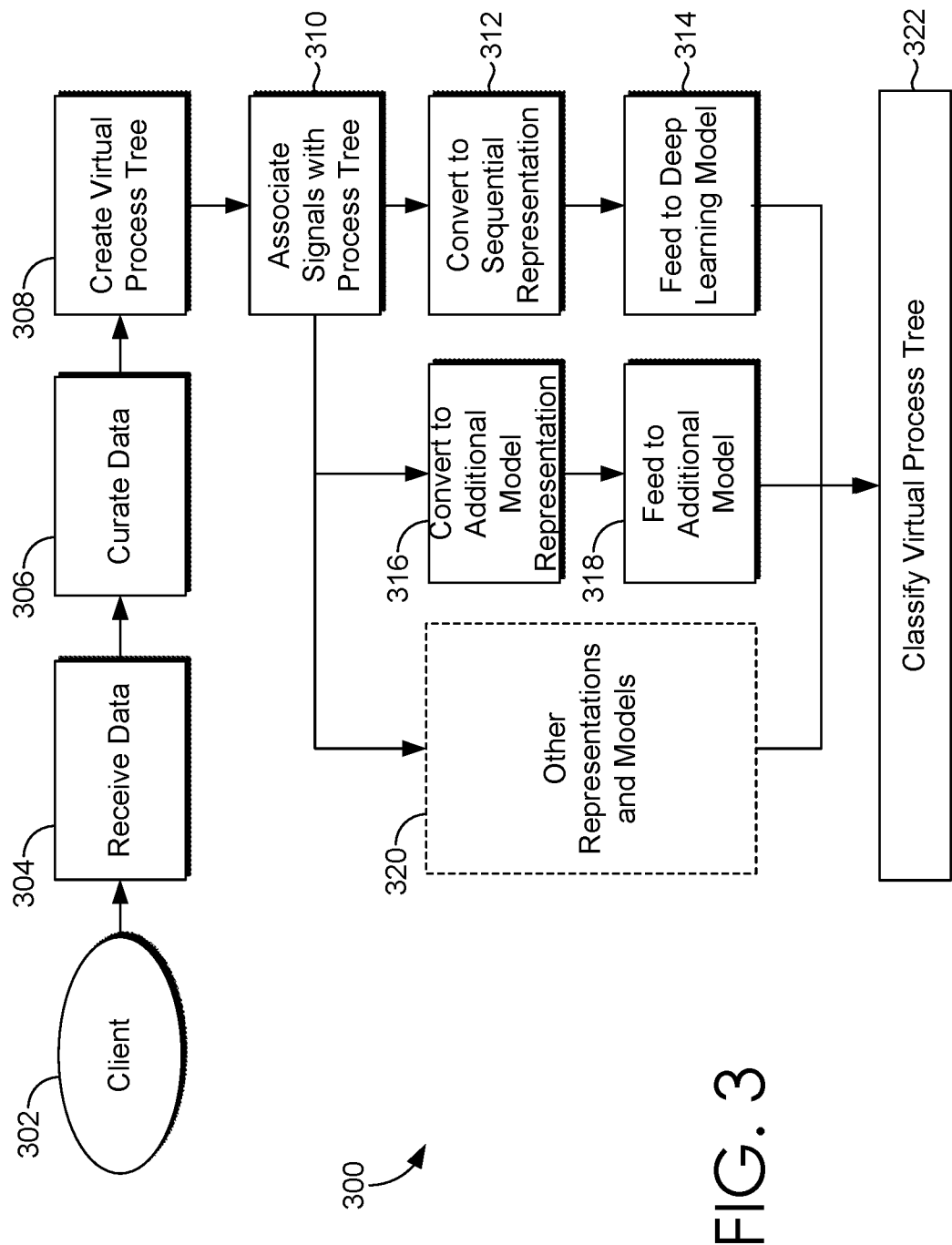
FIG. 3 is a flow diagram providing a first, high-level example method of scoring events using a trained model, in accordance with aspects of the technology described herein.
Figure 4:
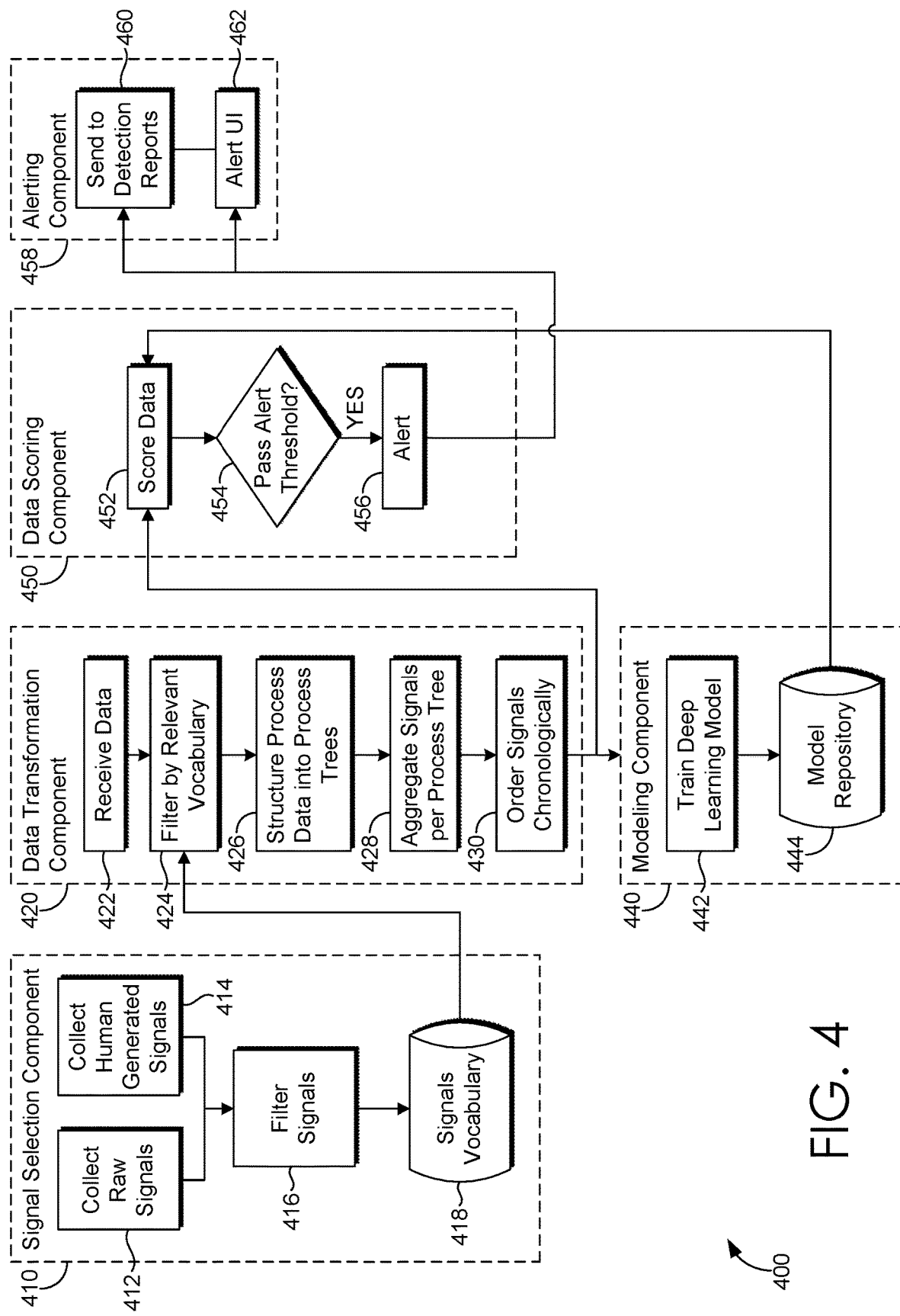
FIG. 4 is a flow diagram providing a second example method of scoring events using a trained model, in accordance with aspects of the technology described herein.
Figure 5:
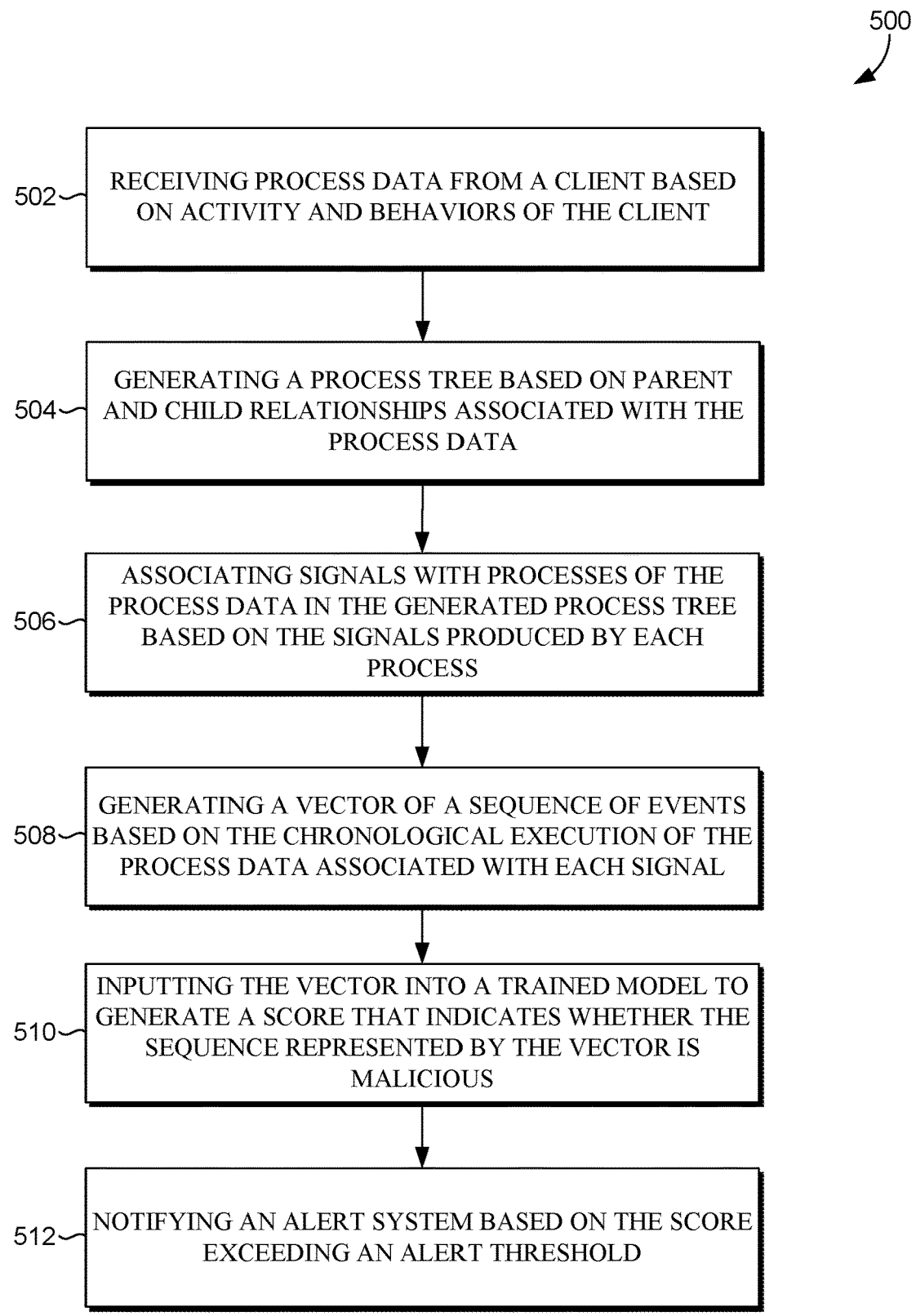
FIG. 5 is flow diagram providing a third example method of scoring events, in accordance with aspects of the technology described herein.

With reference to FIGS. 3-5, flow diagrams and example graphs are provided illustrating methods for scoring events using a trained model based on event scoring operations. The methods may be performed using the event scoring environment described herein. In embodiments, one or more computer storage media having computer executable instructions embodied thereon that, when executed by one or more processors, can cause the one or more processors to perform the methods in the storage system.

Turning to FIG. 3, a flow diagram is provided that illustrates a high-level example method 300 for scoring events using a trained model. Generally, the flow diagram of FIG. 3 can be implemented using the architecture described above at least in conjunction with FIGS. 1 and 2. For example, any suitable combination of portions of method 300 may be implemented into various components of event scoring module 210 such that signals associated with process data are structured into a vector of a sequence of events that is fed into a trained model to determine a score indicative of potentially malicious activity.

Initially, method 300 at block 302 starts with a client. As contemplated herein, a client may be any machine, computer, network, system, or other device that processes and stores data. At block 304 data such as process data, telemetry data, and the like is received from the client at block 302. The data is then curated at block 306. For example, the process data may be curated, filtered, or the like according to a specified period of time. In this way, the process data may be split up according to specified time periods such that time periods with more processes running or executing may be split up according to defined periods. At block 308, a virtual process tree is created based on the curated data from block 306. The virtual process tree generated at block 308 may be represented in any suitable data structure such as, but not limited to a vector or an array. At block 310, signals are associated with the processes in the process tree. In this way, signals are associated with the processes so that the data can be further transformed or converted to be fed into an additional model. As such, embodiments may use one or more models to classify the virtual process tree as malicious or benign.

For example, at block 312 the signals associated with the process tree are converted to a sequential representation such as a vector of a sequence of events. At block 314, the vector of the sequence of events generated in block 312 can be fed into a trained deep learning model that then outputs a score that classifies the virtual process tree at block 322 as potentially malicious or benign based on the score. As another example, at block 316 the signals associated with the tree may be converted into a representation suitable as input into an additional model at block 318. This representation may be the same or different than the sequential representation at block 312 and may be used in conjunction with the model at block 314 to classify the virtual process tree as malicious or benign. As yet another example, the signals associated with the process tree may be converted into another representation suitable as input into another model at block 320. Although not shown for clarity, it is contemplated that any number of suitable representation and models may be used alone or in combination at block 320 to classify the virtual process tree at block 322.

Referring now to FIG. 4, FIG. 4 shows a flow diagram providing a second example method for scoring events using a trained model, in accordance with aspects of the technology described herein. It is contemplated that the components shown in FIG. 4 may be implemented in the various components discussed at least in FIG. 2 describing event scoring module 210 and the components contained therein or in any other suitable manner. For example, signal selection component 410 may be implemented in event filter 212, data transformation component 420 may be implemented in data transformer 214, data scoring component 450 and alerting component 458 may be implemented in event scorer 218, and modeling component 440 may be implemented in scoring model 216.

Initially, signal selection component 410 operates as a pre-processing step such that embodiments generate a signal vocabulary. At block 412, raw signals are collected, and at block 414, human-generated signals are collected. As mentioned above raw signals are signals that are indicative of malicious activity such as registry activity in sensitive places. Human-generated signals refer to signals generated using logic (e.g., a heuristic) created by someone (e.g., a security expert) who has observed malicious activity and recognizes that particular activity (e.g., opening a TOR connection originating from a Windows binary process) is malicious. As a result, both the human-generated signals and the raw signals act as IoCs.

In embodiments, signals may be behavior-based. For example, a signal may be created when an entry in the following registry key of a computer or machine is created: HKEY_LOCAL_MACHINE\Software\Microsoft\Windows\CurrentVersion\Run. A folder and executable file name added to this location automatically runs after a machine starts. As such, this generates persistence on the machine and may be considered an indicator of compromise (IoC). Another example of a behavior-based signal is a service start activity. A program or process that starts a service through the command line using legitimate tools such as net.exe is generally not considered a suspicious activity. However, starting a service created earlier by the same program or process to obtain persistence may be in IoC.

At block 416, the signals collected at blocks 412 and 414 are filtered according to criteria. For example, signals may be filtered according to their usage. In other words, signals may be filtered so that particular signals associated with certain malicious activity may be grouped together and stored as a signals vocabulary at block 418. For example, signals relating to initial access, privilege escalation, credential access, and exfiltration, among others, may be filtered and grouped together as a vocabulary at block 418. As such, a robust signals vocabulary is generated by embodiments at block 418.

Data transformation component 420 initially receives process data at block 422. It is contemplated by the present disclosure that the data receive at block 422 may be any data from a client. At block 422, the process data received is filtered according to the relevant vocabulary. In other words, based on the process data, a relevant signal vocabulary will be selected such that relevant signals may be aggregated with the processes. For example, process data that indicates potential data exfiltration based on activity of the process data then the signal vocabulary related to exfiltration may be selected. At block 426, the process data is structured, converted, or otherwise transformed into process trees. In embodiments, the process data may be structured into multiple trees based on criteria such as timing. For example, processes executing from time t1 to t3 may be structured into one process tree. Processes executing from time t4 to t8 may be structured into another process tree. In this way, the process data is structured such that processes during a certain period of time are formed into one process tree.

At block 428, embodiments aggregate or combine signals for each process generated at block 426. The signals are aggregated into each process tree such that a signal is associated with a process. Thus, a process tree may have one or more signals associated with one or more processes. After aggregating the signals in the process tree, embodiments order the signals chronologically based on the execution of the processes at block 430 and generate a data structure (e.g., vector) that maintains the chronological order of the signals based on parent and child relationships of associated processes. In embodiments, the parent and child relationships of the processes are determined based on process identifiers (PIDs) and heuristics associated with the processes. In other words, the signals follow the execution timeline of the processes such that the signals are ordered in the same manner and maintain the same timeline as the processes. Some embodiments of the present disclosure utilize a representation scheme that maintains the chronological order of signals based on the parent and child relationships of associated process. In embodiments, the parent and child relationships are determined based on process identifiers associated with the process data and heuristics, or any combination thereof. For example, a process tree may contain Process_A which produces Signal_X at time t1, Process_B produces Signal_Z at time t2, Process_D proceeds Signal_X at time t3, and Process_E produces Signal_X at time t4. As such, embodiments can generate the sequence "X, Z, X, X" as a vector of events such as [1, 3, 1, 1] by replacing the events by their dictionary indices. As a result, this vectorized sequence of events that takes into account the parent and child relationships of the processes and orders the signals according to the execution may be fed into an appropriate machine learning model. Advantageously, employing a representation scheme in a data structure preserves the order of events and allows machine learning models to consume the ordered data.

Modeling component 440 shows block 442 for training a deep learning model that can take a vectorized sequence of events as input and recognize whether the sequence of events as potentially malicious. It is contemplated that any suitable method for training the deep learning model may be used. Once trained at block 442, the trained model may be stored in model repository 444 for use by data scoring component 450 or any other suitable component.

Figure 6:
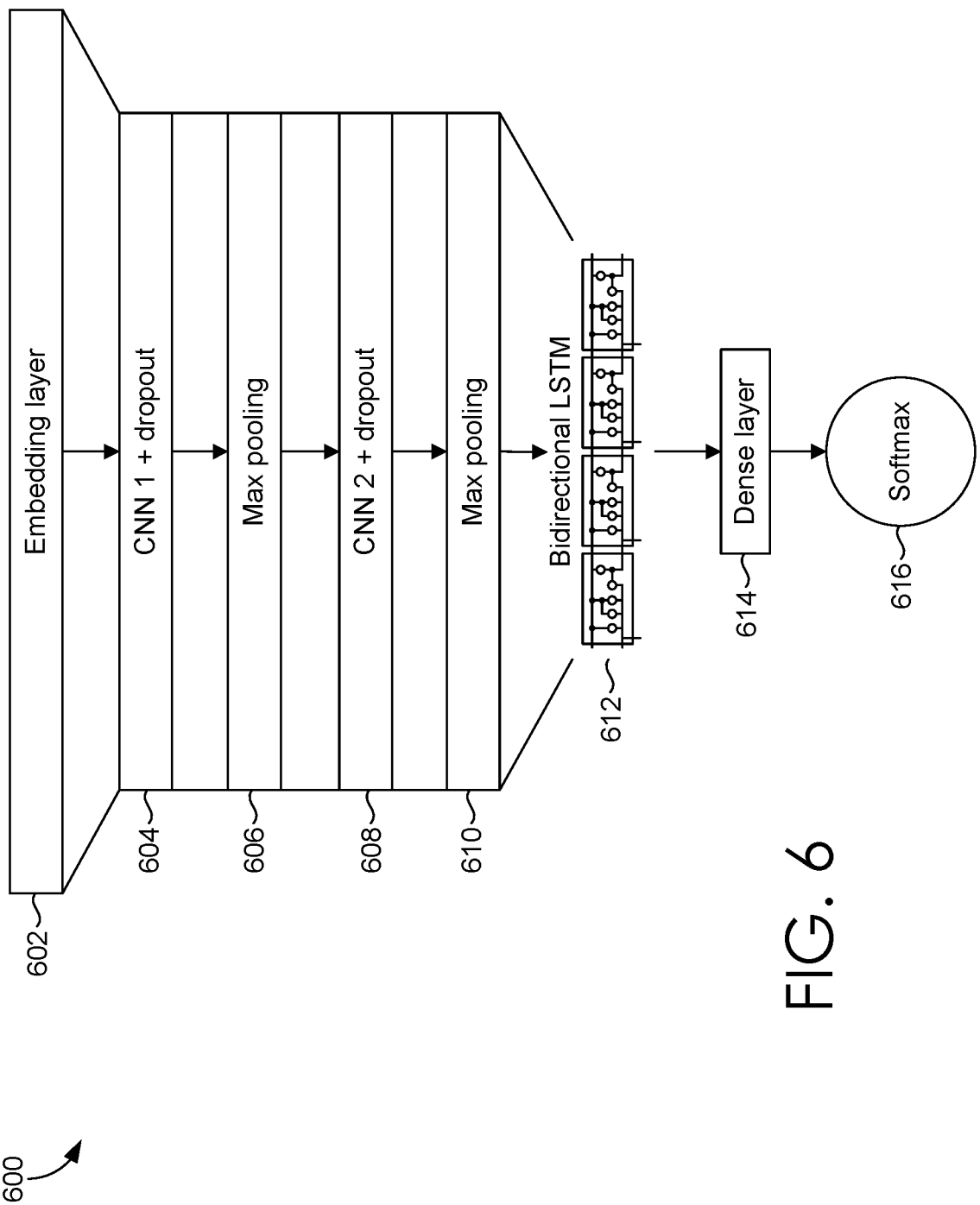
FIG. 6 is an example block diagram illustrating one example architecture of a trained model used in scoring sequences of events, in accordance with aspects of the technology described herein.

Referring to FIG. 6, FIG. 6 shows an example block diagram illustrating one example architecture of a trained model used in scoring sequences of events, in accordance with aspects of the technology described herein. The example architecture of the model 600 in FIG. 6 may be implemented as part of modeling component 440 and may be stored in model repository 444 of FIG. 4. Embodiments of the present disclosure utilize a deep neural network that combines two types of building blocks and/or layers to score sequences of events: a convolutional neural network (CNN) and a bidirectional long short-term memory recurrent neural network (BiLSTM-RNN). By utilizing multiple layers, embodiments of the present disclosure can model long sequences of events to create high-level and localized features for the next layer of the network. These features may represent sequences of events that appear together within the process data. For example, creating and running a file, or saving a file and creating a registry entry to run the file the next time a machine starts. Features created by the CNN layers are easier to digest for the ensuing BiLSTM-RNN layer because of the compression and futurization. As such, the model utilized by embodiments herein uses a combination of several layers: one embedding layer 602, two CNNS each utilizing a max pooling function (604-610), a single BILSTM 612, a dense layer 614, and a softmax function 616. Input to the model is a vectorized sequence of integers representing the signal associated with a process tree during a unit of time.

Due to the number of possible signals within a particular vector of sequence of events, input sequences are initially passed through embedding layer 602. Embedding layer 602 compresses high-dimensional inputs into low-dimensional vectors that can be processed by the network. Initial layers of the network create increasingly high-level features, and the final layer of model 600 performs classification of the sequences of events. The output of the final layer is a score between 0 and 1 that indicates the probability that the sequences of events are malicious. Thus, the score produced may be used along or in combination with other models to predict if the sequences of events are malicious.

Turning back to FIG. 4, data scoring component 450 takes the vectorized sequences of events generated from data transformation component 420 and uses a trained deep learning model from model repository 444 of modeling component 440 to score the sequence of events at block 452. After scoring the sequence of events at block 454, embodiments determine if the score passes an alert threshold. The alert threshold may be set in any suitable way by any suitable entity. For example, a security team may set the alert threshold to be lower based on a heightened sense of security. Alternatively, the alert threshold may be set higher so that only hyper critical events are alerted to a security team. If the alert threshold is exceeded or satisfied, an alert is generated at block 456 and communicated to alerting component 458. Although not shown for clarity, if the alert threshold is not exceeded or satisfied, the scored sequence of events may be stored in a repository for future analysis. Alerting component 458 may receive alert 456 at block 460 and communicate the alert in any suitable way. For example, alerting component 458 may send alert 456 to a detection report along with information related to the scored sequence of events (e.g., the calculated score). As another example, alert 456 may be sent to a user interface displaying the alert to a particular user to take action based on analysis of the alert. The alert may include any additional information related to the scored sequence of events and may be communicated by alerting component 458.

Turning now to FIG. 5, FIG. 5 shows a flow diagram providing a third example method of scoring events, in accordance with aspects of the technology described herein. As shown, method 500 may be performed by an events scoring module and related components, such as those described previously with reference to FIGS. 1, 2, and 3. Initially, at step 502 process data is received from a client based on activity and behaviors of the client. At step 504, a process tree is generated based on parent and child relationships of the process data. In embodiments, the process tree may generated based on process identifiers (PIDs) and other heuristics. At step 506, signals are associated with the processes of the process data in the generated process tree based on the signals produced by each process. At step 508, a vector of a sequence of events is generated based on parent and child relationships of the process data associated with each signal determined by process identifiers (PIDs) and heuristics. At block 510, the vector is input into a trained model to generate a score that indicates whether the sequence represented by the vector is malicious. At step 512 an alert systems is notified based on the score exceeding (or satisfying) an alert threshold.

Example Attack Detected Using Trained Model of the Technology Disclosed Herein

Figure 7:
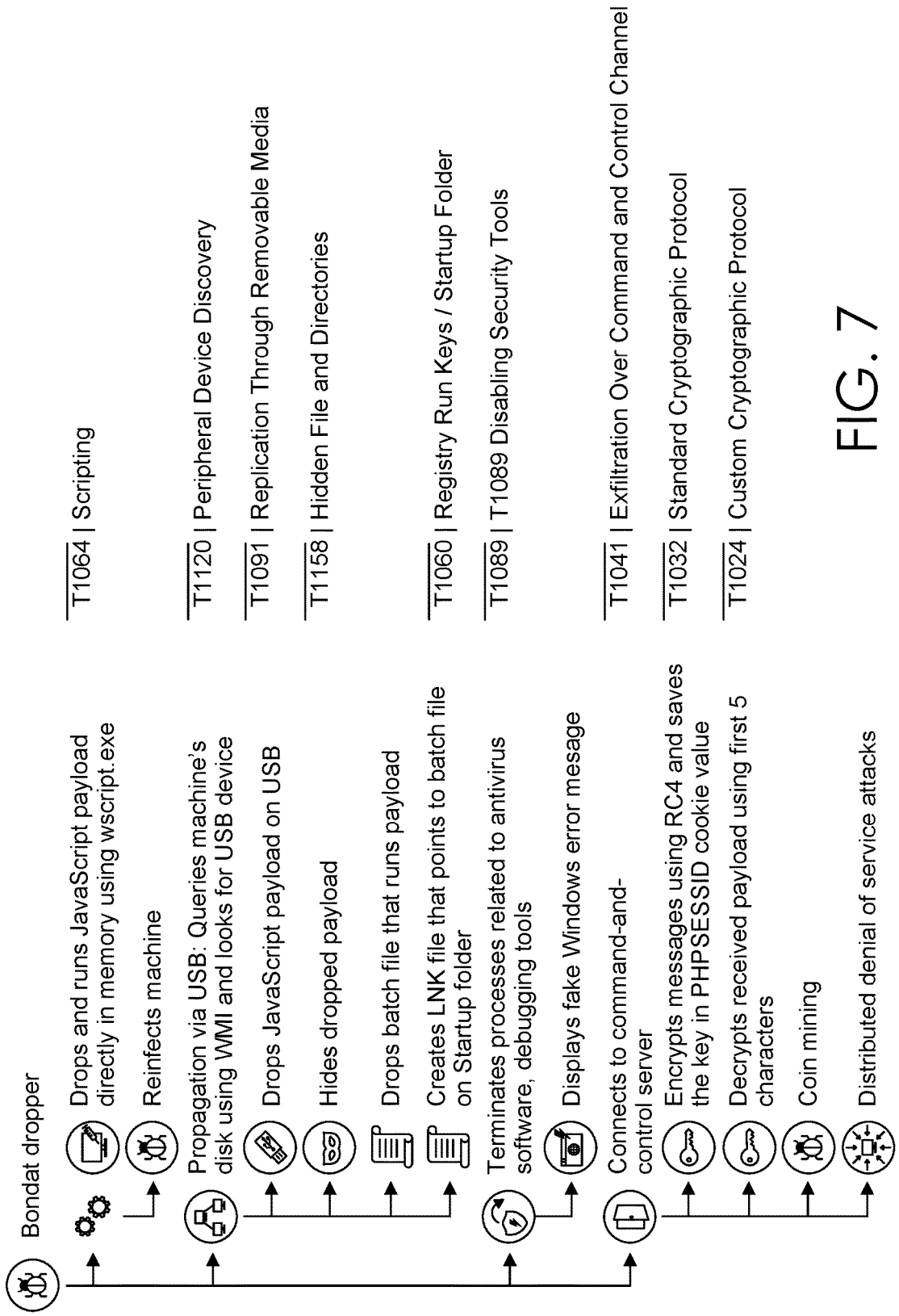
FIG. 7 is an example illustration providing an example attack detected using a trained model taking a sequence of events as input, in accordance with aspects of the technology described herein.

Referring now to FIG. 7, FIG. 7 illustrates an example illustration providing an example attack detected using a trained model taking a sequence of events as input, in accordance with aspects of the technology described herein. An example process tree for the Bondat worm is shown detailing the attack chain utilized by the Bondat worm to propagate to other systems and execute a distributed denial of service attack.

As shown in the process tree, the Bondat worm attack initially drops a JavaScript payload, which it runs directly in memory using wscript.exe. The JavaScript payload uses a randomly generated filename as a way to evade detections. However, Antimalware Scan Interface (AMSI) exposes malicious script behaviors. To spread via USB devices, the malware leverages WMI to query the machine's disks by calling "SELECT*FROM Win32_DiskDrive." When it finds a match for "/usb," it copies the JavaScript payload to the USB device and creates a batch file on the USB device's root folder. The said batch file contains the execution command for the payload. As part of its social engineering technique to trick users into running the malware in the removable device, it creates a LNK file on the USB pointing to the batch file. The malware terminates processes related to antivirus software or debugging tools. Notably, after terminating a process, the malware pops up a window that imitates a Windows error message to make it appear like the process crashed.

The malware communicates with a remote command-and-control (C2) server by implementing a web client (MSXML). Each request is encrypted with RC4 using a randomly generated key, which is sent within the "PHPSESSID" cookie value to allow attackers to decrypt the payload within the POST body. Every request sends information about the machine and its state following the output of the previously executed command. The response is saved to disk and then parsed to extract commands within an HTML comment tag. The first five characters from the payload are used as a key to decrypt the data, and the commands are executed using the eval( ) method. Once the command is parsed and evaluated by the JavaScript engine, any code can be executed on an affected machine, for example, download other payloads, steal sensitive info, and exfiltrate stolen data. For this Bondat campaign, the malware is capable of running coin mining or coordinated distributed denial of service (DDoS) attacks.

As a result of the malware's activities, several signals were triggered throughout the attack chain as shown under the associated signals in FIG. 7. The signals shown are from the MITRE ATT&CK® repository. This repository is a globally-accessible knowledge base of adversary tactics and techniques based on real-world observations. The ATT&CK knowledge base is used as a foundation for the development of specific threat models and methodologies in the private sector, in government, and in the cybersecurity product and service community. Embodiments of the present disclosure vectorized the signals associated with the processes in FIG. 7 into a sequence of events and used the trained models described herein to determine that the process tree in FIG. 7 was malicious. As a result several alerts were generated by embodiments of the present disclosure including "persistence" (e.g., the malware copies itself into the Startup folder and drops a LNK file pointing to the malware cop that opens when the computer starts), "renaming a known operating system tool" (e.g., the malware renames wscript.exe into a random filename), "dropping a file with the same filename as legitimate tools" (e.g., the malware impersonates legitimate system tools by dropping a file with a similar name to a known tool), "suspicious command line" (e.g., the malware tries to delete itself form a previous location using a command line executed by a process spawned by wscript.exe), "suspicious script content" (e.g., when the JavaScript malware runs, AMSI exposes and identifies malicious behavior), and "suspicious network communication" (e.g., the malware connects to malicious domains).

Example Distributed Computing Environment

Figure 8:
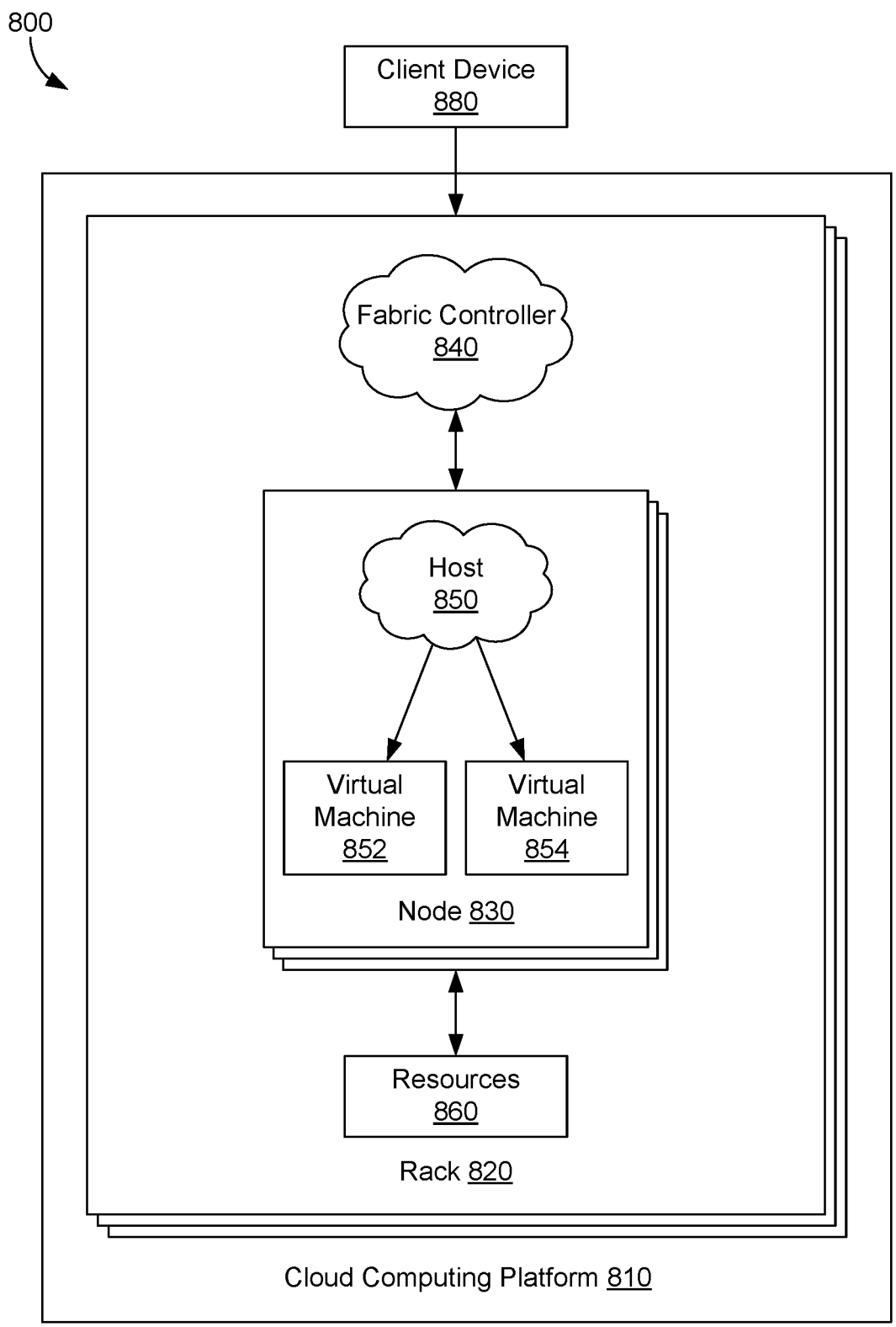
FIG. 8 provides a block diagram of an exemplary distributed computing environment suitable for use in implementing aspects of the technology described herein.

Referring now to FIG. 8, FIG. 8 illustrates an example distributed computing environment 800 in which implementations of the present disclosure may be employed. In particular, FIG. 8 shows a high level architecture of an example cloud computing platform 810 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 800 that includes cloud computing platform 810, rack 820, and node 830 (e.g., computing devices, processing units, or blades) in rack 820. The technical solution environment can be implemented with cloud computing platform 810 that runs cloud services across different data centers and geographic regions. Cloud computing platform 810 can implement fabric controller component 840 for provisioning and managing resource allocation, deployment, upgrade, and management of cloud services. Typically, cloud computing platform 810 acts to store data or run service applications in a distributed manner. Cloud computing infrastructure 810 in a data center can be configured to host and support operation of endpoints of a particular service application. Cloud computing infrastructure 810 may be a public cloud, a private cloud, or a dedicated cloud.

Node 830 can be provisioned with host 850 (e.g., operating system or runtime environment) running a defined software stack on node 830. Node 830 can also be configured to perform specialized functionality (e.g., compute nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines can also concurrently run separate service applications. The virtual machines or physical machines can be configured as individualized computing environments that are supported by resources 860 (e.g., hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device referred to as a cluster. Each server in the cluster can be implemented as a node.

Client device 880 may be linked to a service application in cloud computing platform 810. Client device 880 may be any type of computing device, which may correspond to computing device 900 described with reference to FIG. 9, for example, client device 900 can be configured to issue commands to cloud computing platform 810. In embodiments, client device 880 may communicate with service applications through a virtual Internet Protocol (IP) and load balancer or other means that direct communication requests to designated endpoints in cloud computing platform 810. The components of cloud computing platform 810 may communicate with each other over a network (not shown), which may include, without limitation, one or more local area networks (LANs) and/or wide area networks (WANs).

Example Operating Environment

Figure 9:
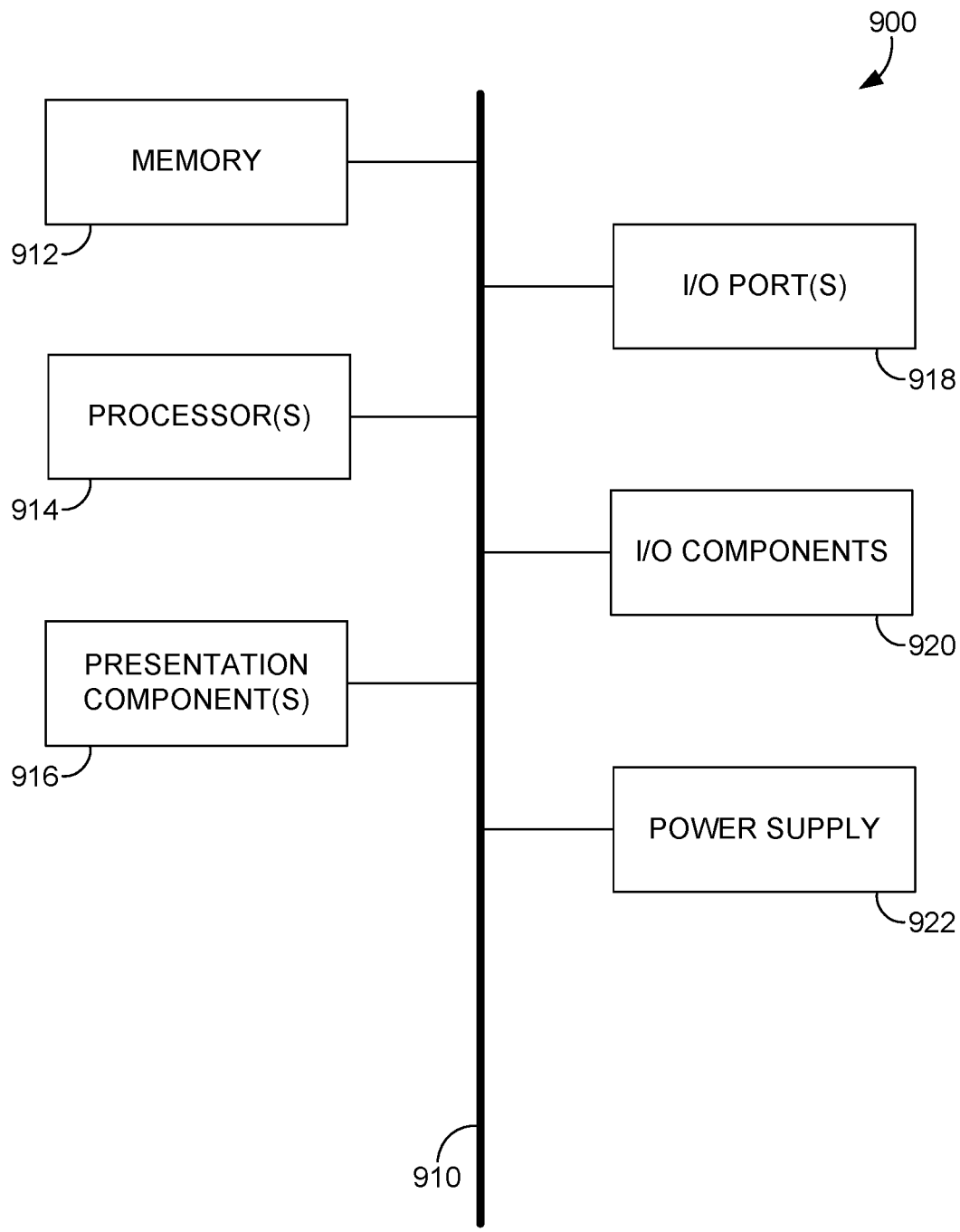
FIG. 9 is a block diagram of an exemplary computing environment suitable for use in implementing aspects of the technology described herein.

Having briefly described an overview of embodiments of the present disclosure, an example operating environment in which embodiments of the present disclosure may be implemented is described below in order to provide a general context for various aspects of the present disclosure. Referring initially to FIG. 9 in particular, an example operating environment for implementing embodiments of the present disclosure is shown and designated generally as computing device 900. Computing device 900 is but one example of a suitable computing environment and is not intended to suggest any limitation as to the scope of use or functionality of the disclosure. Neither should computing device 900 be interpreted as having any dependency or requirement relating to any one or combination of components illustrated.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output ports 918, input/output components 920, and illustrative power supply 922. Bus 910 represents what may be one or more buses (such as an address bus, data bus, or combination thereof). The various blocks of FIG. 9 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control, and memory operations. Low level software written in machine code can provide more complex functionality to higher levels of software. As used herein, computer-executable instructions include any software, including low level software written in machine code, higher level software such as application software, and any combination thereof. In this regard, the system components can manage resources and provide services for system functionality. Any other variations and combinations thereof are contemplated within embodiments of the present disclosure.

By way of example, the technical solution system can include an Application Programming Interface (API) library that includes specifications for routines, data structures, object classes, and variables that may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

Embodiments of the present disclosure have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:
receiving process data from a client computer system based on activity and behaviors of the client computer system;
generating a process tree based on parent and child relationships associated with the process data, wherein the process data is associated with a plurality of processes;
associating, in the process tree, each of the plurality of processes with a corresponding signal associated with signal data;
based on the process tree comprising the parent and child relationships and a chronology of execution of the plurality processes having corresponding signals, generating a vector of a sequence of events, wherein the vector is associated with scoring a probability that the sequence of events from the vector is malicious,
the vector is a representation of the process tree comprising a first process that produces a first signal at a first time and a second process that produces a second signal at a second time, the first process and the second process have a parent and child relationship;
inputting the vector into a trained model associated with registry-related features of a plurality of sequences of events that indicate malicious activity, the registry-related features of the plurality of sequences of events correspond to registry-related features in training process data, training signal data, and training chronology of execution and relationship between processes data,
the trained model is configured to evaluate the vector for potentially malicious activity;
based on inputting the vector into the trained model, generating a score that indicates whether the sequence of events represented by the vector is malicious, wherein the score is generated using the trained model, the parent and child relationships, chronology of execution of the plurality processes represented in the in the sequence of events of the vector, and registry-related features associated with the sequence of events; and
based on the score satisfying an alert threshold, causing a security risk mitigation action.

2. The method of claim 1, wherein the signal data is further comprised of at least one of raw signals or signals generated by human-generated logic based on analyzing activity performed by the client.

3. The method of claim 1, wherein the signal data is received from a signal repository comprised of filtered signals based on activity associated with the signals.

4. The method of claim 1, wherein a registry-related feature is associated with a registry modification of a registry key, the registry-related feature is identifiable in the plurality of sequences of events that indicate malicious activity and in training process data, training signal data, or training chronology of execution and relationship between processes data.

5. The method of claim 1, wherein the trained model is comprised of:
an embedding layer;
two convolutional neural networks; and
a bidirectional long short-term memory recurrent neural network.

6. The method of claim 5, wherein the embedding layer compresses the sequence of events into low-dimensional vectors that are further processed by the trained model.

7. The method of claim 1, wherein the score indicates the probability of the sequence of events being malicious.

8. The method of claim 1, wherein the alert threshold is determined based on an indication of a degree of malicious activity or threat to detect on the client computer system.

9. The method of claim 1, wherein predicting whether the sequence of events is malicious is based on using the trained model in combination with a plurality of other models.

10. A behavior scoring computer system comprising:
one or more hardware processors; and
one or more computer-readable media having executable instructions embodied thereon, which, when executed by the one or more processors, cause the one or more hardware processors to execute:
a signal scoring model configured to:
receive process data from a client computer based on activity and behaviors of the client computer system;
generate a process tree based on parent and child relationships associated with the process data, wherein the process data is associated with a plurality of processes;
associate, in the process tree, each of the plurality of processes with a corresponding signal associated with signal data;
based on the process tree comprising the parent and child relationships and a chronology of execution of the plurality processes having corresponding signals, generate a vector of a sequence of events, wherein the vector is associated with scoring a probability that the sequence of events from the vector is malicious,
the vector is a representation of the process tree comprising a first process that produces a first signal at a first time and a second process that produces a second signal at a second time, the first process and the second process have a parent and child relationship;
input the vector into a trained model associated with registry-related features of a plurality of sequences of events that indicate malicious activity, the registry-related features of the plurality of sequences of events correspond to registry-related features in training process data, training signal data, and training chronology of execution and relationship between processes data,
the trained model is configured to evaluate the vector for potentially malicious activity;
based on inputting the vector into the trained model, generate a score that indicates whether the sequence of events represented by the vector is malicious, wherein the score is generated using the trained model, the parent and child relationships, chronology of execution of the plurality processes represented in the in the sequence of events of the vector, and registry-related features associated with the sequence of events; and
based on the score satisfying an alert threshold, causing a security risk mitigation action.

11. The system of claim 10, wherein the signal data is further comprised of at least one of raw signals or signals generated by human-generated logic based on analyzing activity performed by the client computer.

12. The system of claim 10, wherein the signal data is received from a signal repository comprised of filtered signals based on activity associated with the signals.

13. The system of claim 10, wherein a registry-related feature is associated with a registry modification of a registry key, the registry-related feature is identifiable in the plurality of sequences of events that indicate malicious activity and in training process data.

14. The system of claim 10 further comprising, wherein predicting whether the sequence of events is malicious is based on using the trained model in combination with a plurality of other models.

15. One or more computer storage media storing computer-useable instructions that, when used by one or more computing devices, cause the one or more computing devices to perform operations comprising:
receiving process data from a client computer system based on activity and behaviors of the client computer system;
generating a process tree based on parent and child relationships associated with the process data, wherein the process data is associated with a plurality of processes;
associating, in the process tree, each of the plurality of processes with a corresponding signal associated with signal data;
based on the process tree comprising the parent and child relationships and a chronology of execution of the plurality processes having corresponding signals, generating a vector of a sequence of events, wherein the vector is associated with scoring a probability that the sequence of events from the vector is malicious,
the vector is a representation of the process tree comprising a first process that produces a first signal at a first time and a second process that produces a second signal at a second time, the first process and the second process have a parent and child relationship;
inputting the vector into a trained model associated with registry-related features of a plurality of sequences of events that indicate malicious activity, the registry-related features of the plurality of sequences of events correspond to registry-related features in training process data, training signal data, and training chronology of execution and relationship between processes data,
the trained model is configured to evaluate the vector for potentially malicious activity;
based on inputting the vector into the trained model, generating a score that indicates whether the sequence of events represented by the vector is malicious, wherein the score is generated using the trained model, the parent and child relationships, chronology of execution of the plurality processes represented in the in the sequence of events of the vector, and registry-related features associated with the sequence of events; and
based on the score satisfying an alert threshold, causing a security risk mitigation action.

16. The media of claim 15, wherein the signal data is further comprised of at least one of raw signals or signals generated by human-generated logic based on analyzing activity performed by the client computer.

17. The media of claim 15, wherein the signal data is received from a signal repository comprised of filtered signals based on activity associated with the signals.

18. The media of claim 15, wherein a registry-related feature is associated with a registry modification of a registry key, the registry-related feature is identifiable in the plurality of sequences of events that indicate malicious activity and in training process data, training signal data, or training chronology of execution and relationship between processes data.

19. The media of claim 15, wherein the score is a number between 0 and 1 indicating the probability of the sequence of events being malicious.

20. The media of claim 15, wherein predicting whether the sequence of events is malicious is based on using the trained model in combination with a plurality of other models.

* * * * *